United States Patent
Abe et al.

(10) Patent No.: US 7,754,135 B2
(45) Date of Patent: Jul. 13, 2010

(54) THREE DIMENSIONAL STRUCTURE PRODUCING METHOD AND PRODUCING DEVICE

(75) Inventors: Satoshi Abe, Moriguchi (JP); Isao Fuwa, Osaka (JP); Yoshikazu Higashi, Moriyama (JP); Hirohiko Togeyama, Tondabayashi (JP); Norio Yoshida, Kitakatsuragi-gun (JP); Masataka Takenami, Osaka (JP); Takashi Shimizu, Kadoma (JP); Shushi Uenaga, Moriguchi (JP)

(73) Assignee: Panasonic Electric Works Co., Ltd., Kadoma-shi, Osaka (JP)

( * ) Notice: Subject to any disclaimer, the term of this patent is extended or adjusted under 35 U.S.C. 154(b) by 1236 days.

(21) Appl. No.: 10/546,455

(22) PCT Filed: Feb. 25, 2004

(86) PCT No.: PCT/JP2004/002187
§ 371 (c)(1),
(2), (4) Date: Dec. 23, 2005

(87) PCT Pub. No.: WO2004/076103
PCT Pub. Date: Sep. 10, 2004

(65) Prior Publication Data
US 2006/0208396 A1    Sep. 21, 2006

(30) Foreign Application Priority Data
Feb. 25, 2003    (JP)    ............................. 2003-048307

(51) Int. Cl.
*B29C 35/08*    (2006.01)
*B29C 37/02*    (2006.01)
*B29C 41/02*    (2006.01)
*B29C 41/52*    (2006.01)

(52) U.S. Cl. ...................... 264/408; 264/40.1; 264/161; 264/163; 264/497

(58) Field of Classification Search ................ 264/161, 264/163, 497, 40.1, 408, 409, 410; 419/6, 419/61; 219/121.6, 121.85, 121.29, 121.8, 219/121.83
See application file for complete search history.

(56) References Cited

U.S. PATENT DOCUMENTS 5,637,175 A * 6/1997 Feygin et al. ................ 156/264

(Continued)

FOREIGN PATENT DOCUMENTS

DE    9514740    4/1996

(Continued)

OTHER PUBLICATIONS

English language Abstract of DE 19853978.

(Continued)

*Primary Examiner*—Leo B Tentoni
(74) *Attorney, Agent, or Firm*—Greenblum & Bernstein P.L.C.

(57) ABSTRACT

A three-dimensional object is made by repeating a process. An optical beam is irradiated on a predetermined portion of a powdery layer to form a sintered layer. A new powdery layer is formed on a surface of the sintered layer. An optical beam is irradiated on a predetermined portion of the new powdery layer to form a new sintered layer united with the underlying sintered layer. Because a portion of the sintered layer that is higher than a predetermined level is removed as occasion demands, the abnormally sintered portion on the sintered layer can be removed, making it possible to prevent stoppage of the shaping process, which may be caused by the abnormally sintered portion.

11 Claims, 11 Drawing Sheets

U.S. PATENT DOCUMENTS

| | | | |
|---|---|---|---|
| 5,730,925 A | 3/1998 | Mattes et al. | |
| 6,657,155 B2 | 12/2003 | Abe et al. | |
| 2002/0041818 A1* | 4/2002 | Abe et al. | 419/7 |
| 2005/0029711 A1 | 2/2005 | Abe et al. | |

FOREIGN PATENT DOCUMENTS

| | | | |
|---|---|---|---|
| DE | 9853978 | | 5/2000 |
| DE | 9905067 | | 8/2000 |
| DE | 0300959 | | 7/2004 |
| JP | 62296976 A | * | 12/1987 |
| JP | 1-502890 | | 10/1989 |
| JP | 2000-073108 | | 3/2000 |
| JP | 2001-315213 | | 11/2001 |
| JP | 2002-115004 | | 4/2002 |
| JP | 2002-210835 | | 7/2002 |
| JP | 2002-540945 | | 12/2002 |
| JP | 20031714 A | * | 1/2003 |
| WO | 88/02677 | | 4/1988 |

OTHER PUBLICATIONS

English language Abstract of DE 19905067.
English language Abstract of DE 10300959.
English language Abstract of DE 19514740.
English language Abstract of JP 2001-315213.
English Language Abstract of JP 1-502890.
English Language Abstract of JP 2000-073108.
English Language Abstract of JP 2002-115004.
English Language Abstract of JP 2002-210835.
English Language Abstract of JP 2002-540945.
U.S. Appl. No. 10/546,454 to Abe et al., filed Aug. 19, 2005.
U.S. Appl. No. 10/671,689 to Abe et al., filed Sep. 29, 2005.
English Language Abstract of JP 2002-115004.

* cited by examiner

THREE DIMENSIONAL STRUCTURE PRODUCING METHOD AND PRODUCING DEVICE

TECHNICAL FIELD

The present invention relates to a method of and apparatus for making a three-dimensional object by irradiating an optical beam on a powdery layer to form a sintered layer and by laminating sintered layers one above another.

BACKGROUND ART

A method of making a three-dimensional object by laminating sintered layers is known in, for example, Japanese Laid-Open Patent Publication No. 1-502890, wherein an optical beam (directional energy beam, for example, a laser) is first irradiated on a powdery layer formed on a support base to form a sintered layer. The sintered layer thus obtained is then covered with a new powdery layer, on which the optical beam is irradiated to form a new sintered layer. These processes are repeatedly carried out to form a three-dimensional object in which a plurality of sintered layers are laminated one above another.

A method of finishing a surface of a shaped object, i.e., a laminated body made up of the sintered layers in the middle of the manufacture of the three-dimensional object is disclosed in, for example, Japanese Laid-Open Patent Publication No. 2002-115004.

As shown in FIG. 19A, when an optical beam is irradiated on a predetermined portion of a powdery layer 10 for selective sintering, sparks scatter and a residue of molten powder contained in the sparks sometimes adheres to a surface of a sintered layer 11, as shown in FIG. 19B, resulting in abnormal sintering 19 in the form of protrusions.

In applications where finish machining is conducted during the laminating process of the sintered layers 11, working scraps (cutting scraps) scatter, and if such working scraps give rise to protrusions on a surface of the next powdery layer 10, there is a good chance that abnormally sintered portions 19 in the form of protrusions may be produced during subsequent sintering.

In applications where each powdery layer 10 is set to have a thickness of 50 µm in order to obtain a three-dimensional object having a high density and a high geometry, powder particles have a diameter of about 10-50 µm. In this case, if the abnormally sintered portions 19 are produced, there is a fairly good chance that they may protrude upwardly from a surface of the subsequent layer 10, and a leveling blade for leveling the surface of the powdery layer 10 may be brought into contact with the abnormally sintered portions 19, thereby stopping the shaping process.

The present invention has been developed to overcome the above-described disadvantages.

It is accordingly an objective of the present invention to provide a method of and apparatus for making a three-dimensional object that is free from a stop of the shaping process, which has been hitherto caused by the abnormally sintered portions.

DISCLOSURE OF THE INVENTION

In accomplishing the above objective, the method of making a three-dimensional object according to the present invention includes: (a) forming a powdery layer; (b) irradiating an optical beam on a predetermined portion of the powdery layer to form a sintered layer; (c) forming a new powdery layer on a surface of the sintered layer; (d) irradiating an optical beam on a predetermined portion of the new powdery layer to form a new sintered layer united with the underlying sintered layer; (e) removing, after the step (b) or (d), a portion of the sintered layer that is higher than a predetermined level as occasion demands; and (f) repeating the steps (c), (d) and (e) to form a plurality of sintered layers.

The above-described method according to the present invention can remove the abnormally sintered portion that has been produced on the sintered layer, and can prevent a stop of the shaping process, which may be caused by the abnormally sintered portion.

The presence or absence of the abnormally sintered portion on the surface of the sintered layer is detected every time each sintered layer is formed. If only the abnormally sintered portion is removed upon detection thereof, the removing work can be conducted within a short period of time.

If the presence or absence of the abnormally sintered portion is determined by detecting a load applied to a blade that acts to level the surface of the powdery layer, any device dedicated to detect the abnormally sintered portion is not needed and, hence, the detection of the abnormally sintered portion can be conducted at a low cost. On the other hand, if the presence or absence of the abnormally sintered portion is optically detected, the position where the abnormally sintered portion has been produced can be readily recognized in two dimensions, making it possible to reduce a removing region of the abnormally sintered portion.

If machining for removal of the abnormally sintered portion is conducted only to the detected abnormally sintered portion and its vicinities, the removing working can be completed within a short period of time. If the machining for removal of the abnormally sintered portion is conducted to the whole surface of the sintered layer or the whole surfaces of the sintered layer and the powdery layer, the abnormally sintered portion can be positively removed even if it has been missed at the time of detection. If only a portion of the abnormally sintered portion that is positioned at a higher level than a lower end of the blade for leveling the surface of the powdery layer is removed, the period of time required for removal working can be minimized.

The apparatus for making a three-dimensional object according to the present invention includes a table, a powdery layer-forming unit for forming a powdery layer on the table, an optical beam-irradiating unit for irradiating an optical beam on a predetermined region of the powdery layer to sinter the predetermined region of the powdery layer, a machining unit for finish machining a surface of a predetermined number of sintered layers, an abnormally sintered portion-detecting unit for detecting the presence or absence of an abnormally sintered portion on a surface of each of the sintered layers, and an abnormally sintered portion-removing unit for removing the abnormally sintered portion detected by the abnormally sintered portion-detecting unit.

The provision of the abnormally sintered portion-detecting unit for detecting the abnormally sintered portion on the surface of the sintered layer and the abnormally sintered portion-removing unit for removing the detected abnormally sintered portion can prevent a stop of the shaping process, which may be caused by the abnormally sintered portion.

In terms of low cost, it is preferred that the abnormally sintered portion-detecting unit detects the abnormally sintered portion by detecting a load applied to the blade for leveling the surface of the powdery layer, and the machining unit driven along a removing path that is computed depending on a position of the detected abnormally sintered portion also serves as the abnormally sintered portion-removing unit.

DETAILED DESCRIPTION OF THE PREFERRED EMBODIMENT

An embodiment of the present invention is explained hereinafter with reference to the drawings.

Figure 1:
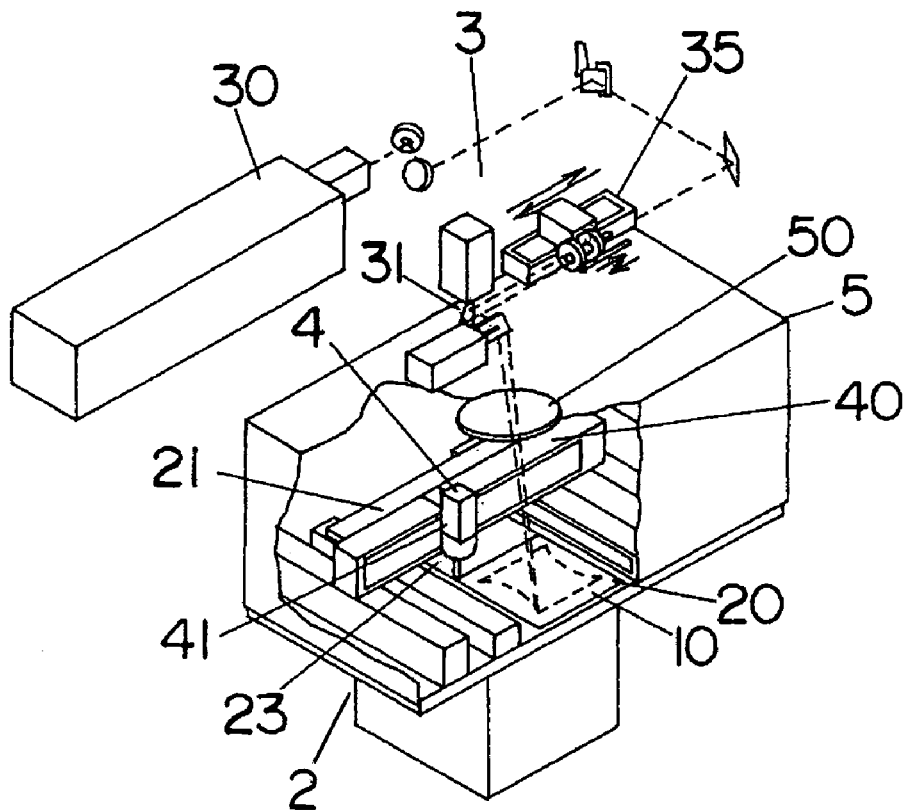
FIG. 1 is a perspective view, partly in section, of an apparatus for making a three-dimensional object according to the present invention.
Figure 2:
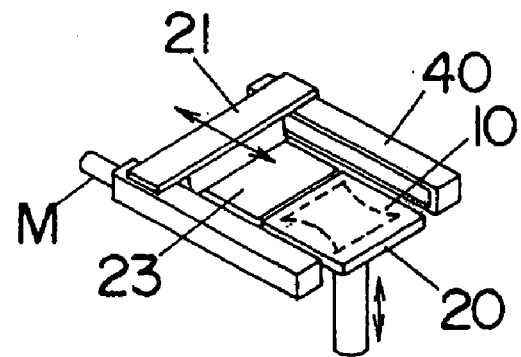
FIG. 2 is a perspective view of a portion of the apparatus of FIG. 1.
Figure 3:
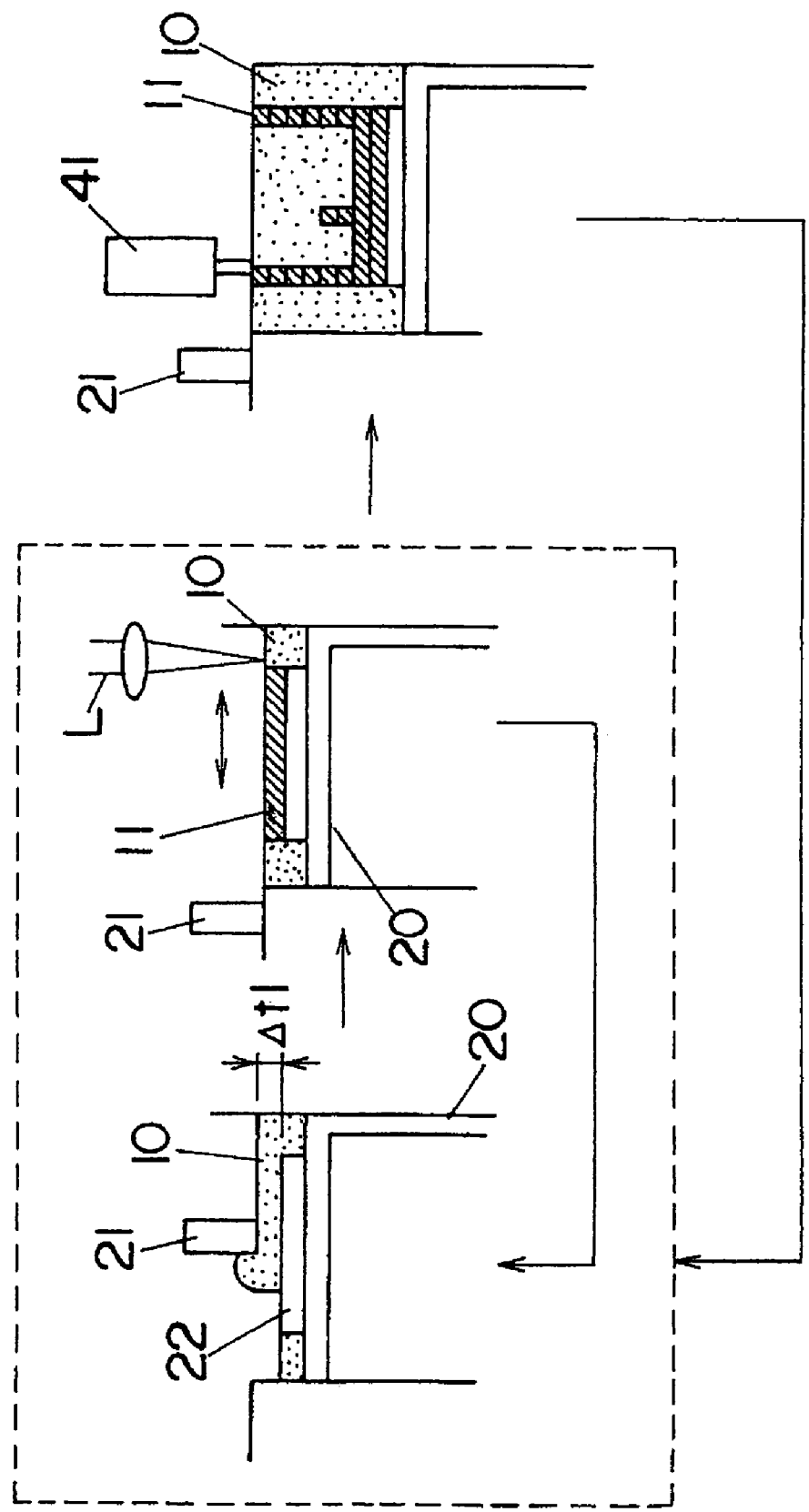
FIG. 3 is a vertical sectional view of the apparatus of FIG. 1 during shaping.

FIGS. 1 and 3 depict an apparatus for making a three-dimensional object according to the present invention. The apparatus shown therein includes a powdery layer-forming unit 2 for forming a powdery layer 10 on a table 20, an optical beam-irradiating unit 3 for irradiating an optical beam on a predetermined region of the powdery layer so formed, a surface layer-machining unit 4 for machining a surface layer on a predetermined number of sintered layers, an abnormally sintered portion-detecting unit for detecting the presence or absence of an abnormally sintered portion 19 on a surface (upper surface) of each sintered layer, and an abnormally sintered portion-removing unit for removing the abnormally sintered portion 19 detected by the abnormally sintered portion-detecting unit. The powdery layer-forming unit 2, the surface layer-machining unit 4 and the like are accommodated within a chamber 5.

The powdery layer-forming unit 2 forms a powdery layer 10 of a predetermined thickness $\Delta t1$ on a vertically movable table 20 that is vertically movable within a limited space by a cylinder, by supplying and leveling a metallic powdery material on the table 20 with the use of a leveling blade 21.

The optical beam-irradiating unit 3 irradiates a laser outputted from a laser generator 30 on a powdery layer 10 via a scanning optical system that includes a galvanomirror 31, a beam shape-correcting unit 35 and the like. The optical beam-irradiating unit 3 is disposed outside the chamber 5, and the optical laser emitted therefrom is irradiated on the powdery layer 10 through a light transmitting window 50 mounted on the chamber 5. A material permeable to the optical laser is used for the window 50. In the case where the laser generator 30 is a $CO_2$ laser, a flat plate made of ZnSe or the like can be used.

The surface layer-machining unit 4 includes an XY drive unit 40 mounted on a base of the powdery layer-forming unit 2 and a milling head 41 mounted on the XY drive unit 40.

The abnormally sintered portion-detecting unit determines the presence or absence of the abnormally sintered portion by detecting a torque of a drive motor for the leveling blade 21, and the surface layer-machining unit 4 also serves as the abnormally sintered portion-removing unit.

FIG. 3 depicts how to make a three-dimensional object using the apparatus referred to above. As shown therein, a metallic powdery material that has overflowed a powder tank 23 is first supplied on a shaping base 22 mounted on the table 20 by the leveling blade 21. The metallic powdery material so supplied on the base 22 is simultaneously leveled by the leveling blade 21 to form a first powdery layer 10, and an optical beam (laser beam) L is then irradiated on a desired portion of the first powdery layer 10 to sinter it, thereby forming a sintered layer 11 united with the base 22.

Thereafter, the table 20 is lowered by a predetermined length, and a second powdery layer 10 is formed on both the first powdery layer 10 and the sintered layer 11 by supplying the metallic powdery material again and by leveling it using the leveling blade 21. The optical beam L is again irradiated on a desired portion of the second powdery layer 10 to sinter it, thereby forming another sintered layer 11 united with the underlying sintered layer 11.

The process of forming a new powdery layer 10 after the table 20 has been lowered and the process of irradiating the optical beam L on a desired portion of the new powdery layer 10 to form a new sintered layer 11 are repeatedly carried out, thereby making a target three-dimensional object as a laminated body of the sintered layers. A $CO_2$ laser is preferably used as the optical beam. In applications where the three-dimensional object is a forming die, the preferred thickness $\Delta t1$ of each powdery layer 10 is about 0.05 mm.

Figure 4:
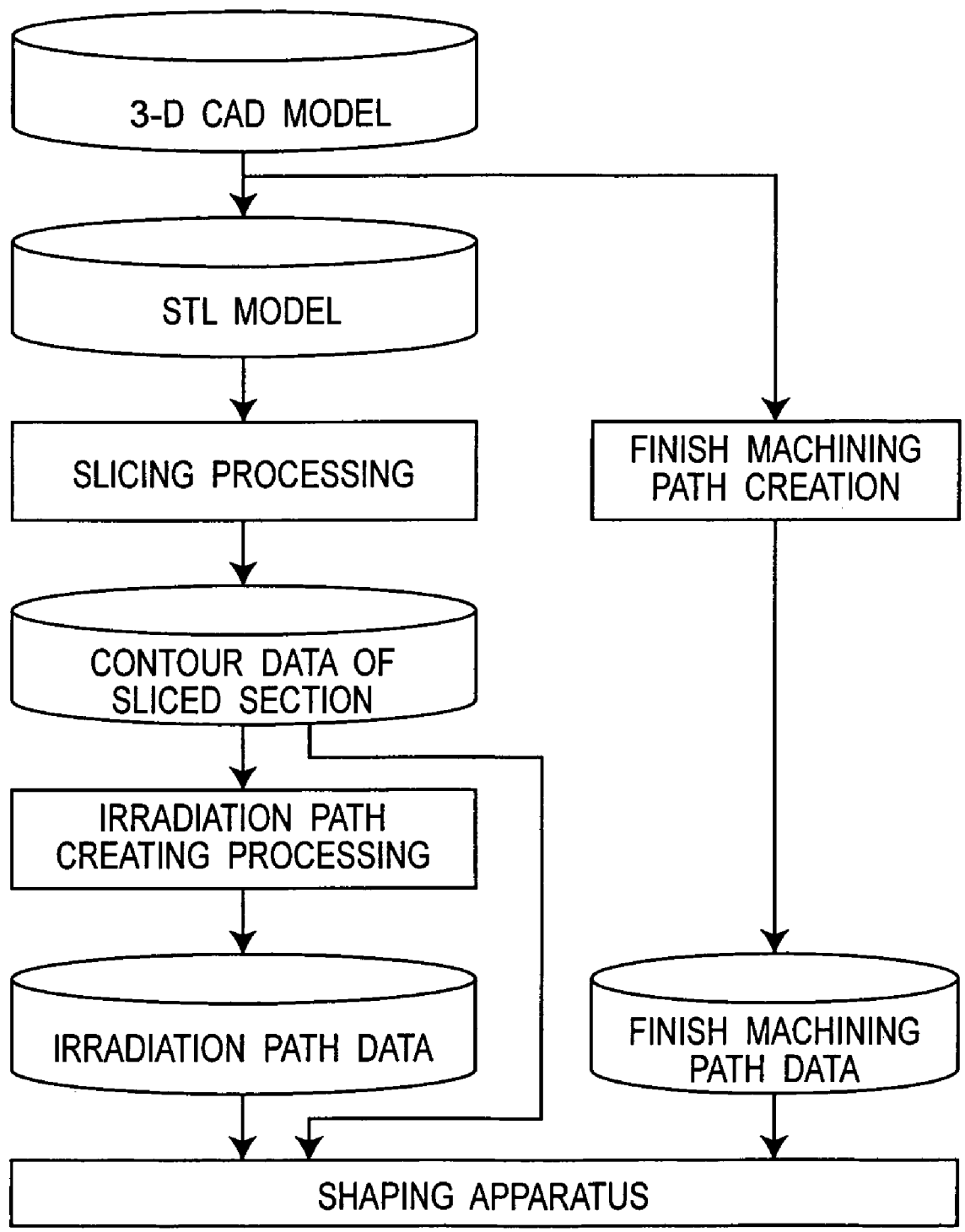
FIG. 4 is a block diagram depicting the shaping by the apparatus of FIG. 1.

As shown in FIG. 4, data indicative of a path for optical beam irradiation can be prepared from three-dimensional CAD data in advance. For example, contour data of each section are prepared by slicing STL data, created from a three-dimensional CAD model, at equal pitches (0.05 mm in the case where $\Delta t1$ is 0.05 mm), and an irradiating path creating processing is conducted on such data to create the data indicative of the path for optical data irradiation, which are then inputted together with the contour data into the apparatus.

During formation of the sintered layers 11 by repeating the steps of forming a powdery layer 10 and then forming a sintered layer 11 by irradiating an optical beam, when the total thickness of the sintered layers 11 reaches a specific value that has been determined from the tool length of, for example, the milling head 41 of the surface layer-machining unit 4, the surface layer-machining unit 4 is activated to cut the surface of the three-dimensional object that has been shaped by that time. For example, a tool (ball end mill) of the milling head 41 having a diameter of 1 mm and an effective blade length of 3 mm can achieve cutting of a depth of 3 mm, and if the thickness $\Delta t1$ of the powdery layer 10 is 0.05 mm, the surface layer-machining unit 4 is activated when sixty sintered layers 11 have been formed.

The surface layer-machining unit 4 can remove a low-density surface layer created by adhesion of the powder to the surface of the shaped object and can simultaneously cut out a portion of the high-density region, thereby exposing the high-density region over the entire surface of the shaped object.

As shown in FIG. 4, a path for cutting by the surface layer-machining unit 4 as well as the path for laser irradiation is prepared from the three-dimensional CAD data in advance. Although the path for cutting is determined based on the so-called contour-line processing, the vertical pitch of the path for cutting is not always required to be the same as the pitch of lamination during sintering. If the target object has a gentle slope, a smooth surface can be obtained by reducing the vertical pitch for interpolation.

Figure 6:
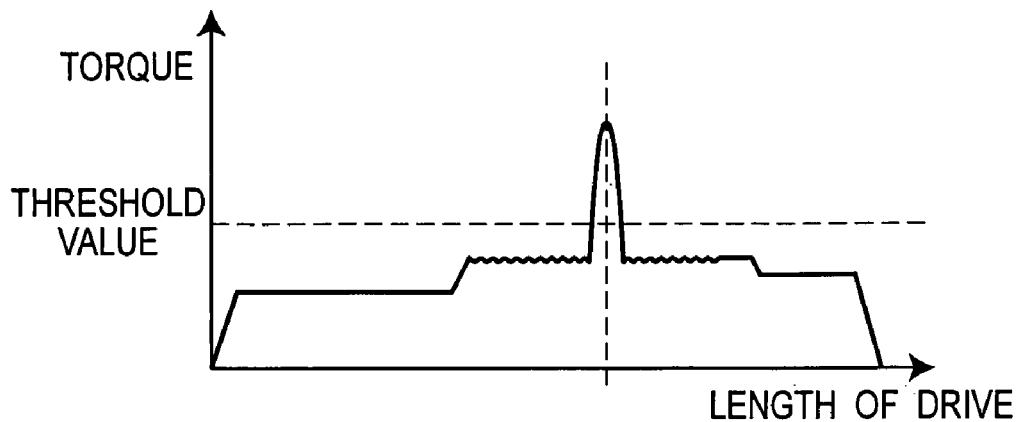
FIG. 6 is a graph depicting torque variations of a drive motor when a leveling blade mounted in the apparatus of FIG. 1 has been brought into contact with the abnormally sintered portion.

In the apparatus for making the three-dimensional object according to the present invention, when the blade 21 is motor-driven to supply a powdery material on an upper surface of a sintered layer 11 that has been just formed, if the height of an abnormally sintered portion 19 produced on a surface (upper surface) of the sintered layer 11 is higher than the thickness of the next powdery layer 10, the blade 21 is brought into contact with the abnormally sintered portion 19, resulting in an increase in torque of the drive motor. If the torque value exceeds a predetermined threshold value, as shown in FIG. 6, a control circuit for controlling the apparatus stops and moves back the blade 21, and a portion of the abnormally sintered portion 19 that is positioned at a higher level (height) than an end (lower end) of the blade 21 is cut and removed. Thereafter, formation of the powdery layer 10 by the blade 21 is conducted again.

Figure 7:
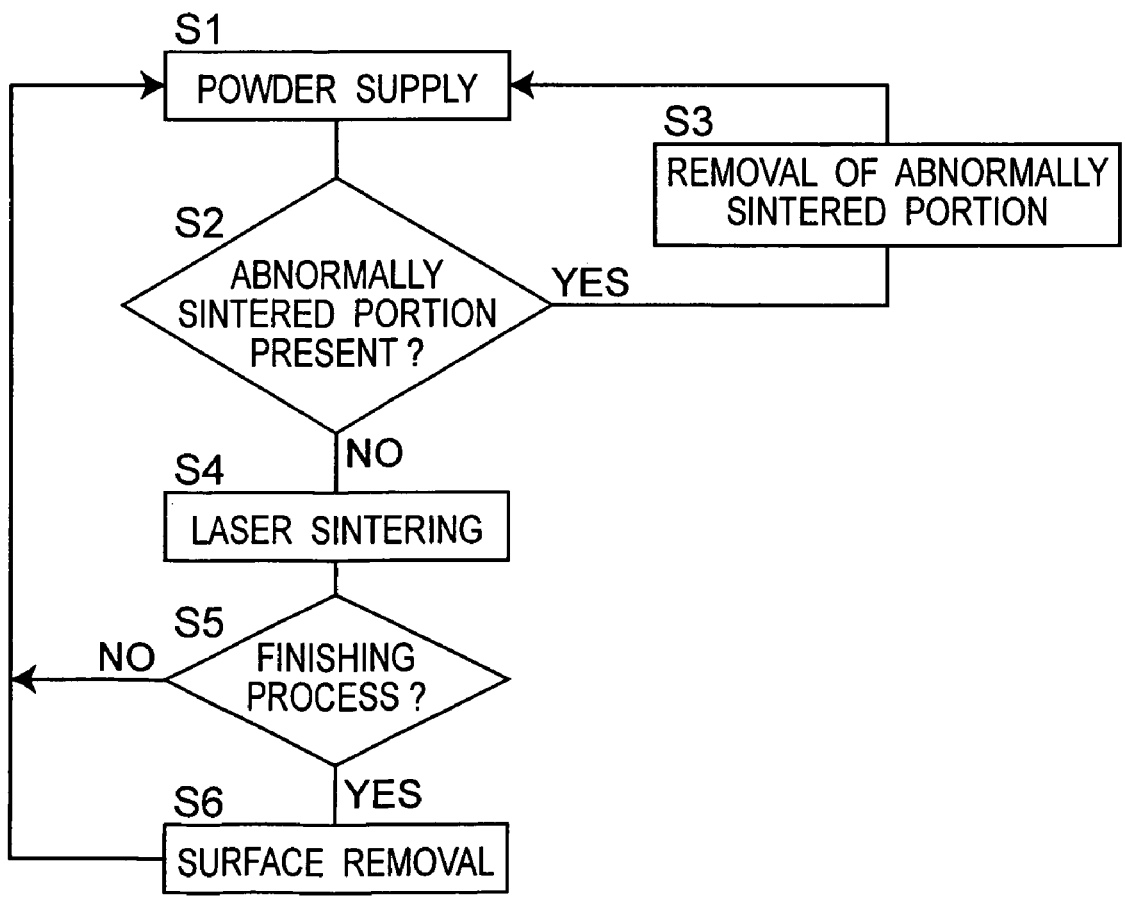
FIG. 7 is a flowchart depicting a flow from a powder supply process to a surface layer-removing working in a finishing process in the apparatus of FIG. 1.

A flow from the powder supply process to the surface layer-removing working in the finishing process is further explained hereinafter with reference to FIG. 7.

At step S1, a powdery material is first supplied by the powdery layer-forming unit 2, and at step S2, the presence or absence of an abnormally sintered portion 19, i.e., whether or not the blade 21 is brought into contact with the abnormally sintered portion 19 is detected. If the abnormally sintered portion 19 is detected at step S2, a portion of the abnormally sintered portion 19 that is positioned above the end (lower end) of the blade 21 is removed by the surface layer-machining unit 4 at step S3, and the procedure returns to step S1, at which the powdery material is supplied again. On the other hand, if no abnormally sintered portion 19 is detected at step S2, a laser is irradiated on a predetermined region of the powdery layer 10 to form a sintered layer 11 at step S4, and the procedure advances to step S5.

At step S5, a determination is made whether or not a predetermined number of (for example, sixty) sintered layers 11 have been formed, i.e., whether finish machining is needed or not. If a determination has been made that the finish machining is not needed, the procedure returns to step S1, while if a determination has been made that the finish machining is needed, surface layer removal is conducted by the surface layer-machining unit 4 at step S6.

Figure 8:
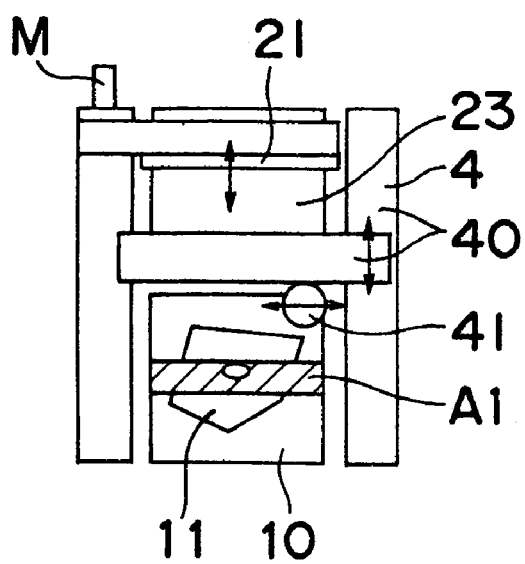
FIG. 8 is a top plan view of the apparatus of FIG. 1, depicting an example of a removing range of the abnormally sintered portion.

If the drive motor for the blade 21 is provided with an encoder, the position where the abnormally sintered portion 19 exists in a direction of drive of the blade 21 can be detected and, hence, a region within which the surface layer-machining unit 4 must be driven to remove the abnormally sintered portion 19 can be limited to a strip-shaped region A1 containing the abnormally sintered portion 19 and having a predetermined length (for example, 1-10 mm) in a direction of movement of the blade 21, as shown in FIG. 8.

Figure 9:
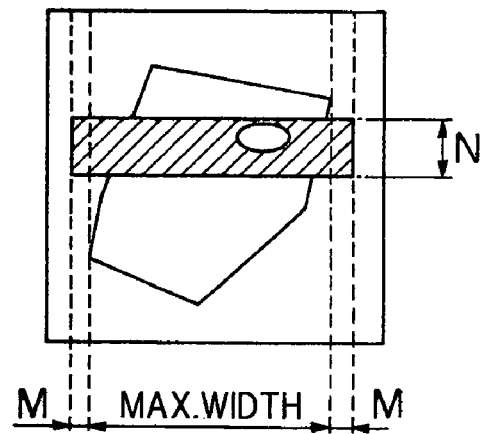
FIG. 9 is an enlarged top plan view of a portion of FIG. 8, depicting another example of the removing range of the abnormally sintered portion.

Alternatively, as shown in FIG. 9, the surface layer-machining unit 4 may be driven for removal of the abnormally sintered portion 19 within a region of a predetermined length N and a predetermined width that includes a maximum width of the sintering region plus margin widths M of a predetermined length on respective sides of the maximum width.

Figure 10:
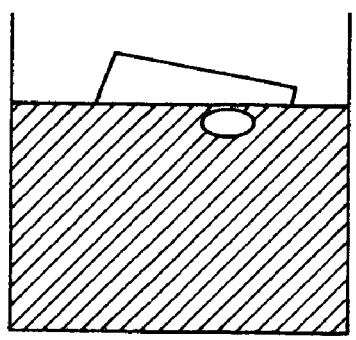
FIG. 10 is an enlarged top plan view of a portion of FIG. 8, depicting a further example of the removing range of the abnormally sintered portion.
Figure 11:
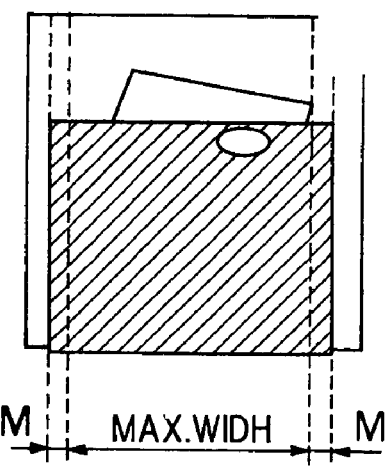
FIG. 11 is an enlarged top plan view of a portion of FIG. 8, depicting a still further example of the removing range of the abnormally sintered portion.

Again alternatively, as shown in FIG. 10, a powdery layer-forming region ahead of the abnormally sintered portion 19 in the direction of drive of the blade 21 can be entirely set as the surface layer-removing region, or as shown in FIG. 11, a powdery layer-forming region of a width including the maximum width of the sintering region plus the margin widths M, which is positioned ahead of the abnormally sintered portion 19 in the direction of drive of the blade 21, can be entirely set as the surface layer-removing region.

Figure 12:
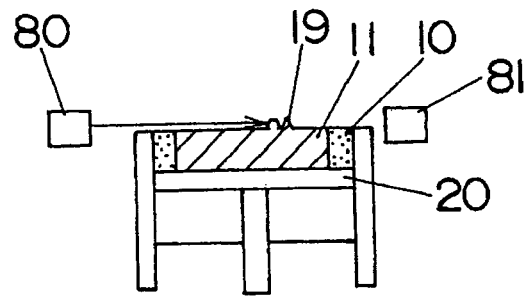
FIG. 12 is a schematic vertical sectional view of an abnormally sintered portion-detecting unit mounted in the apparatus of FIG. 1.
Figure 13A:
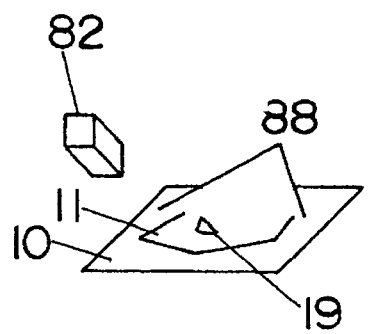
FIG. 13A is a schematic perspective view of another abnormally sintered portion-detecting unit mounted in the apparatus of FIG. 1.
Figure 13B:
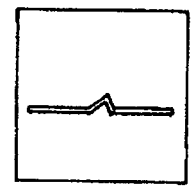
FIG. 13B is a photographic image detected by the abnormally sintered portion-detecting unit of FIG. 13A.

As shown in FIG. 12, the abnormally sintered portion-detecting unit may be made up of a laser irradiating portion 80 and a light receiving portion 81, which form a pair to detect an abnormally sintered portion, or as shown in FIG. 13A, an image of a sintered surface on which the optical beam has been irradiated is picked up by an image pickup unit 82, and the presence or absence of an abnormally sintered portion 19 may be determined based on such an image (see FIG. 13B).

Figure 14:
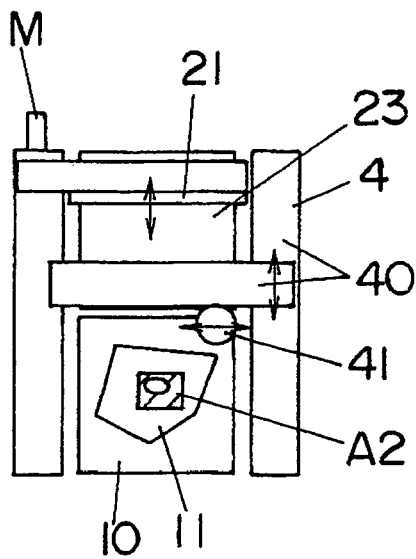
FIG. 14 is a top plan view of the apparatus of FIG. 1, depicting an example of the removing range of the abnormally sintered portion.

Because the latter case can specify the position where the abnormally sintered portion 19 has occurred in biaxial directions, a region within which the surface layer-machining unit 4 is driven for removal of the abnormally sintered portion 19 can be limited to a predetermined narrow region A2 containing the abnormally sintered portion 19, as shown in FIG. 14

Figure 15:
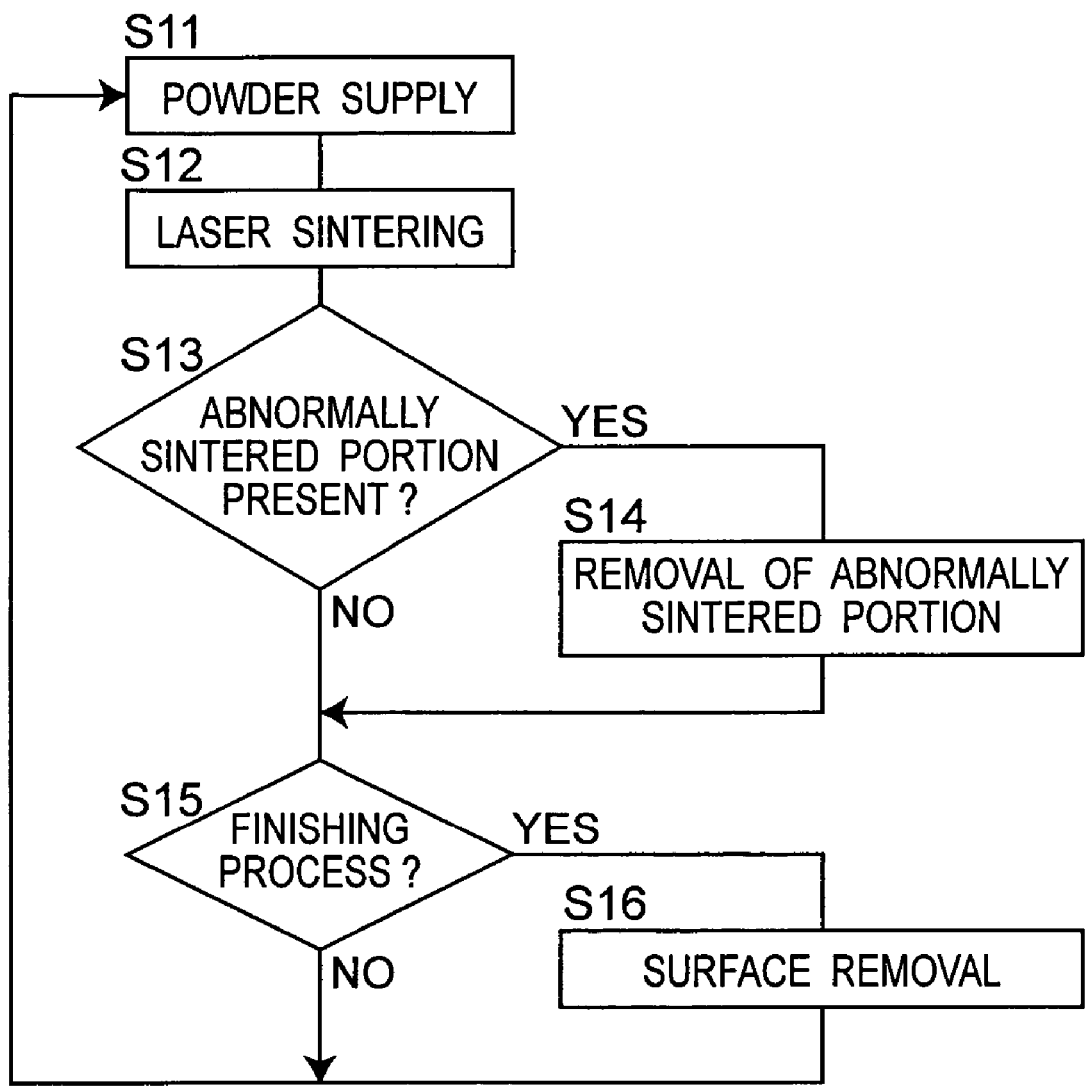
FIG. 15 is a flowchart depicting a flow from a powder supply process to a surface layer-removing working in a finishing process in the apparatus of FIG. 1 having the abnormally sintered portion-detecting unit of FIG. 12 or FIG. 13A.

FIG. 15 is a flowchart depicting a flow from a powder supply process to a surface layer-removing working in a finishing process in the case where the abnormally sintered portion-detecting unit is composed of the laser irradiating portion 80 and the light receiving portion 81, or the image pickup unit 82.

As shown in the flowchart of FIG. 15, a powdery material is first supplied by the powdery layer-forming unit 2 at step S11, followed by step S12, at which a laser is irradiated on a predetermined region of the powdery layer 10 to form a sintered layer 11, and at step S13, the presence or absence of an abnormally sintered layer 19 is determined by the abnormally sintered portion-detecting unit. If the abnormally sintered portion 19 is detected at step S13, a portion of the abnormally sintered portion 19 that is positioned above the end (lower end) of the blade 21 is removed by the surface layer-machining unit 4 at step S14, and the procedure advances to step S15. If a determination has been made at step S13 that no abnormally sintered portion exists, the procedure also advances to step S15.

At step S15, a determination is made whether or not a predetermined number of (for example, sixty) sintered layers 11 have been formed, i.e., whether finish machining is needed or not. If a determination has been made that the finish machining is not needed, the procedure returns to step S11, while if a determination has been made that the finish machining is needed, surface layer removal is conducted by the surface layer-machining unit 4 at step S16.

Figure 16:
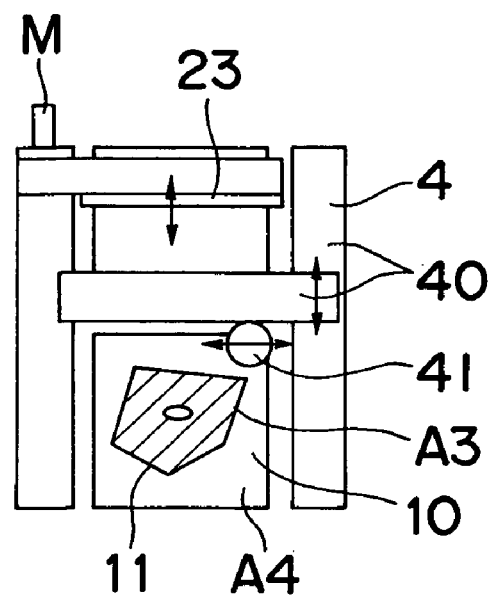
FIG. 16 is a top plan view of the apparatus of FIG. 1, depicting another example of the removing range of the abnormally sintered portion.

Even if the abnormally sintered portion-detecting unit cannot detect the position of the abnormally sintered portion 19, it is sufficient if it can detect only the presence or absence of the abnormally sintered portion 19. In this case, surface layer removal is conducted over the whole surface A3 of the sintered layer 11 or the whole surface A4 containing the powdery layer 10, as shown in FIG. 16.

A machining path along which the surface layer-machining unit 4 is moved is computed and determined by a control circuit depending on the removing region A1-A3. If the removing region is A4, a removing path can be determined in advance.

Figure 5:
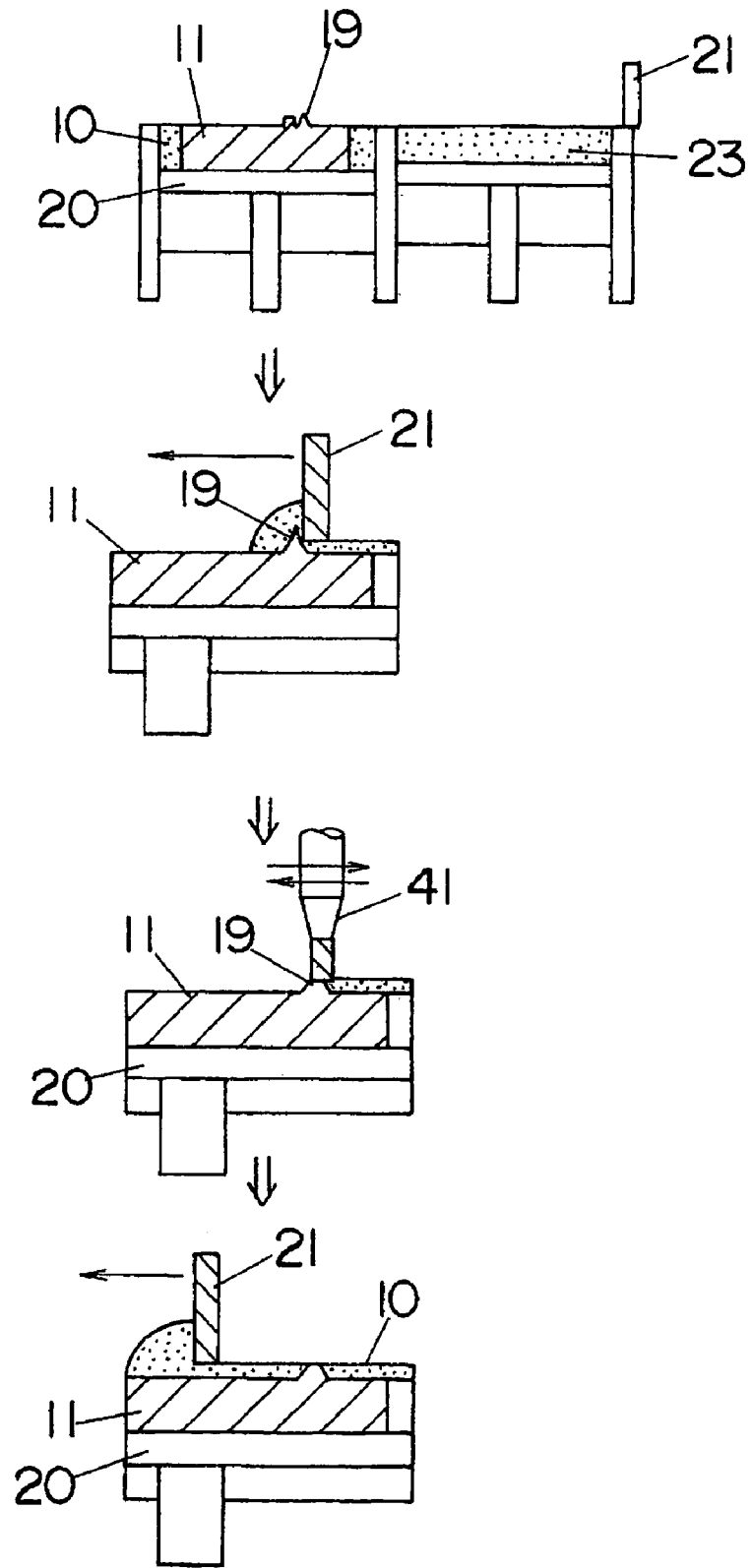
FIG. 5 is a series of explanatory views depicting the operation of the apparatus of FIG. 1 when an abnormally sintered portion has been detected.
Figure 17:
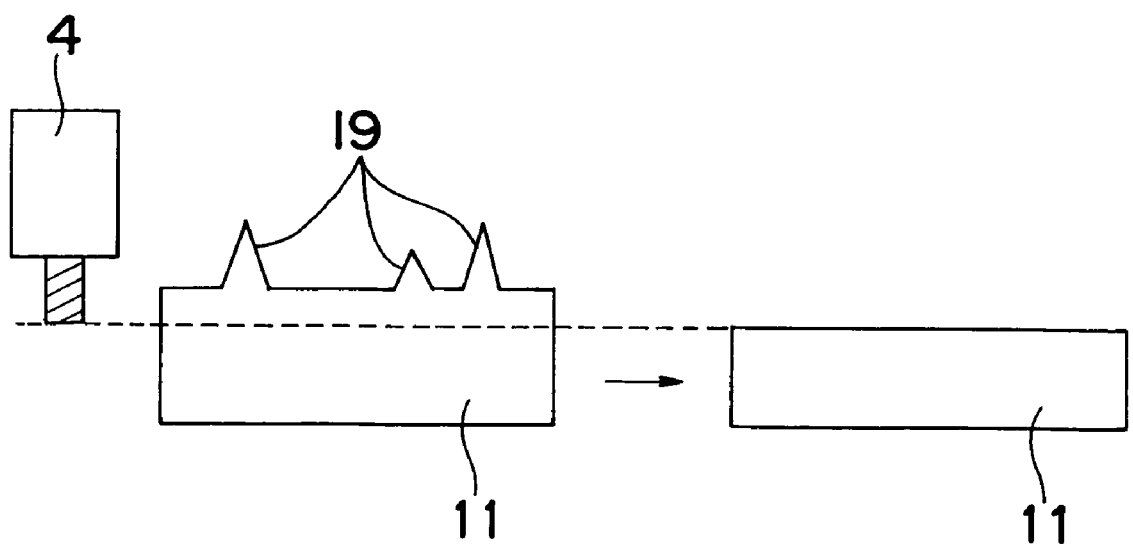
FIG. 17 is an explanatory view depicting a case where a sintered layer has been formed having a thickness greater than a predetermined thickness, and all the sintered layer positioned above the predetermined thickness is removed.

In the above-described embodiment, if the sintered layer 11 has an abnormally sintered portion 19 on a surface thereof that is positioned above the next powdery layer, a portion of the abnormally sintered portion 19 that is positioned at a higher level than the end (lower end) of the blade 21 is removed by the surface layer-machining unit 4, as shown in FIG. 5, but all the abnormally sintered portion 19 may be removed. Alternatively, as shown in FIG. 17, the thickness of each powdery layer may be set to be greater than a predetermined thickness, and in this case, after a sintered layer has been formed having a thickness greater than the predetermined thickness, a portion of the sintered layer that is positioned above the predetermined thickness is all removed. Because the upper surface of the sintered layer is entirely removed irrespective of the presence or absence of the abnormally sintered portion 19, no abnormally sintered portion-detecting unit is needed though the removing period of time becomes long.

Figure 18A:
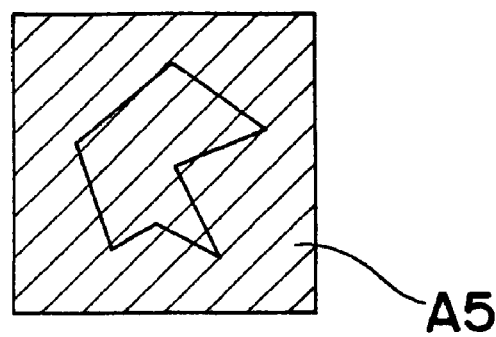
FIG. 18A is an enlarged top plan view of a portion of FIG. 16, depicting a further example of the removing range of the abnormally sintered portion.
Figure 18B:
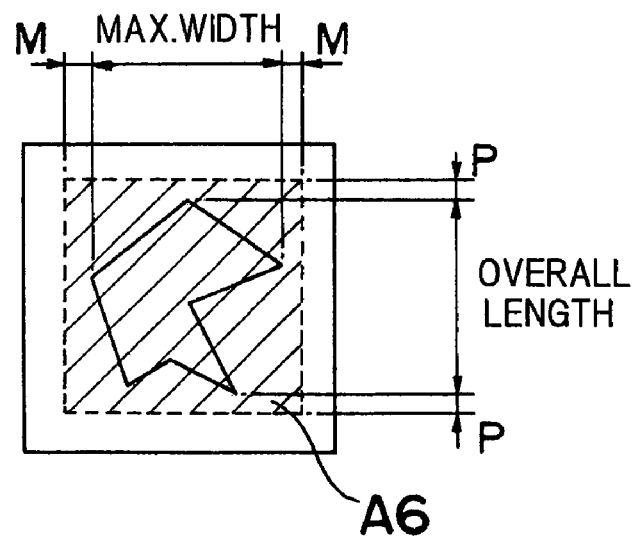
FIG. 18B is an enlarged top plan view of the portion of FIG. 16, depicting a still further example of the removing range of the abnormally sintered portion.
Figure 18C:
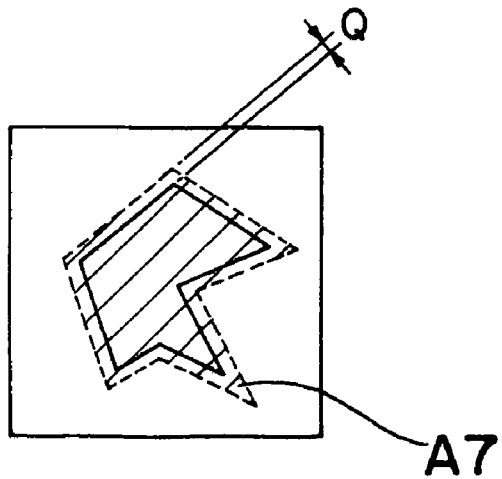
FIG. 18C is an enlarged top plan view of the portion of FIG. 16, depicting another example of the removing range of the abnormally sintered portion.
Figure 19A:
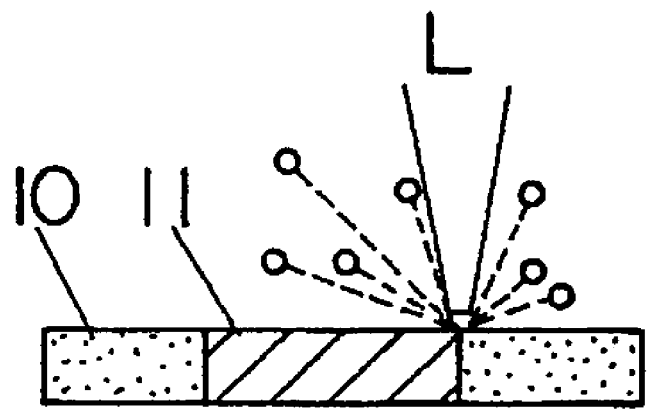
FIGS. 19A and 19B are explanatory views of a production mechanism of the abnormally sintered portions in the apparatus for making the three-dimensional object.
Figure 19B:
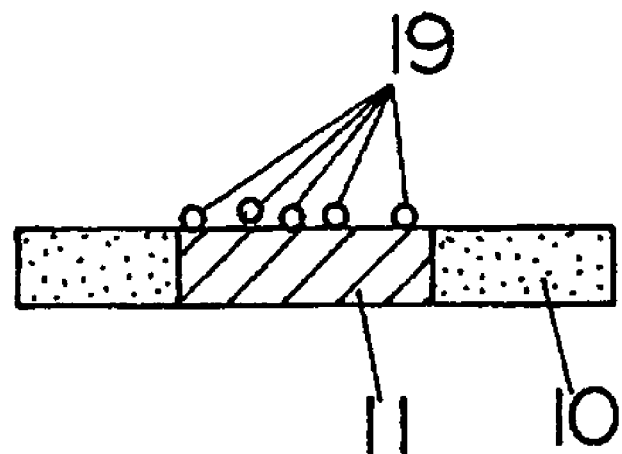

Each of FIGS. 18A to 18C depicts a removing region of the sintered layer in the case where the abnormally sintered portion is not detected.

In the example of FIG. 18A, an entire region (a region in which the powdery layer is formed) on the table 20 is set to a removing region A5, and in the example of FIG. 18B, a removing region A6 is so set as to have a width that includes a maximum width of the sintering region plus margin widths M of a predetermined length on respective sides of the maximum width, and also have a length that includes an overall length of the sintering region in the direction of drive of the blade 21 plus margin widths P of a predetermined length on respective sides of the overall length. Alternatively, as shown in FIG. 18C, a removing region A7 may be so set as to be the sintering region plus a margin width Q of a predetermined length extending outwardly from a contour of the sintering region.

Although in the above-described embodiment the surface layer-machining unit 4 has been described as serving also as the abnormally sintered portion-removing unit, a unit dedicated to remove abnormally sintered portions may be provided independently of the surface layer-machining unit 4. In this case, the surface layer-machining unit 4 is operated to merely machine a surface layer of a predetermined number of sintered layers, while the abnormally sintered portion-removing unit is operated to merely remove the abnormally sintered portions.

In the above-described embodiment, finish machining for the predetermined number of sintered layers 11 is not always required. In applications where the abnormally sintered portion-removing unit for exclusive use is provided, the surface layer-machining unit 4 may be dispensed with.

The invention claimed is:

1. A method of making a three-dimensional object, comprising:
    forming a powdery layer;
    irradiating an optical beam on a predetermined portion of the powdery layer to form a sintered layer;
    forming a new powdery layer on a surface of the sintered layer;
    irradiating an optical beam on a predetermined portion of the new powdery layer to form a new sintered layer united with the underlying sintered layer;
    detecting, after the irradiating an optical beam on a predetermined portion of the powdery layer and the irradiating an optical beam on a predetermined portion of the new powdery layer, presence or absence of and a position of an abnormally sintered portion that has been produced on the surface of the sintered layer and is higher than a powdery layer to be subsequently formed, and subsequently removing, when the abnormally sintered portion is detected, only the abnormally sintered portion and a portion in a vicinity of the abnormally sintered portion that are higher than a height of such powdery layer to be subsequently formed; and
    repeating the forming a new powder layer, the irradiating an optical beam on a predetermined portion of the new powdery layer, the detecting, and the removing, to form a plurality of sintered layers.

2. The method of making a three-dimensional object according to claim 1, wherein the presence or absence of the abnormally sintered portion is determined by detecting a load applied to a blade that acts to level the surface of the powdery layer.

3. The method of making a three-dimensional object according to claim 1, wherein the presence or absence of the abnormally sintered portion is optically detected.

4. The method of making a three-dimensional object according to claim 1, wherein machining for removal of the abnormally sintered portion is conducted only to a predetermined surface area of the sintered layer and the powdery layer.

5. The method of making a three-dimensional object according to claim 4, wherein the predetermined surface area of the sintered layer and the powdery layer is a whole surface of the sintered layer or whole surfaces of the sintered layer and the powdery layer.

6. The method of making a three-dimensional object according to claim 1, wherein a portion of the abnormally sintered portion that is positioned at a higher level than a lower end of a blade for leveling the surface of the powdery layer is removed.

7. A method of making a three-dimensional object, comprising:
   forming a powdery layer;
   irradiating an optical beam on a predetermined portion of the powdery layer to form a sintered layer;
   forming a new powdery layer on a surface of the sintered layer;
   irradiating an optical beam on a predetermined portion of the new powdery layer to form a new sintered layer united with the underlying sintered layer;
   detecting, after the irradiating an optical beam on a predetermined portion of the powdery layer and the irradiating an optical beam on a predetermined portion of the new powdery layer, presence or absence of an abnormally sintered portion that has been produced on the surface of the sintered layer upon detection of a load applied to a blade that acts to level the surface of the powdery layer, stopping and moving the blade back, when the abnormally sintered portion is detected, removing the abnormally sintered portion that is higher than a predetermined level as occasion demands, and forming another powdery layer; and
   repeating the forming a new powdery layer, the irradiating an optical beam on a predetermined portion of the new powdery layer, the detecting, and the removing to form a plurality of sintered layers.

8. The method of making a three-dimensional object according to claim 7, wherein the presence or absence of the abnormally sintered portion is optically detected.

9. The method of making a three-dimensional object according to claim 7, wherein machining for removal of the abnormally sintered portion is conducted only to a predetermined surface area of the sintered layer and the powdery layer.

10. The method of making a three-dimensional object according to claim 9, wherein the predetermined surface area of the sintered layer and the powdery layer is a whole surface of the sintered layer or whole surfaces of the sintered layer and the powdery layer.

11. The method of making a three-dimensional object according to claim 7, wherein a portion of the abnormally sintered portion that is positioned at a higher level than a lower end of the blade for leveling the surface of the powdery layer is removed.

* * * * *

UNITED STATES PATENT AND TRADEMARK OFFICE
CERTIFICATE OF CORRECTION

PATENT NO. : 7,754,135 B2
APPLICATION NO. : 10/546455
DATED : July 13, 2010
INVENTOR(S) : Satoshi Abe et al.

Page 1 of 1

It is certified that error appears in the above-identified patent and that said Letters Patent is hereby corrected as shown below:

Title Page:

In the printed patent, on page 1 of the Cover Page, at Item (56) References Cited, under FOREIGN PATENT DOCUMENTS, "DE 9514740 4/1996" should read -- DE 19514740 4/1996 --.

In the printed patent, on page 1 of the Cover Page, at Item (56) References Cited, under OTHER PUBLICATIONS, insert -- International Preliminary Report on Patentability mailed March 9, 2006, with respect to patent family member PCT/JP2004/002187 --.

In the printed patent, on page 2 of the Cover Page, at Item (56) References Cited, under FOREIGN PATENT DOCUMENTS, "DE 9853978 5/2000" should read -- DE 19853978 5/2000 --.

In the printed patent, on page 2 of the Cover Page, at Item (56) References Cited, under FOREIGN PATENT DOCUMENTS, "DE 9905067 8/2000" should read -- DE 19905067 8/2000 --.

In the printed patent, on page 2 of the Cover Page, at Item (56) References Cited, under FOREIGN PATENT DOCUMENTS, "DE 0300959 7/2004" should read -- DE 10300959 7/2004 --.

Signed and Sealed this
Twenty-second Day of February, 2011

David J. Kappos
*Director of the United States Patent and Trademark Office*